March 9, 1926. 1,575,853
W. F. MacGREGOR
ENSILAGE CUTTER
Filed Sept. 21, 1925
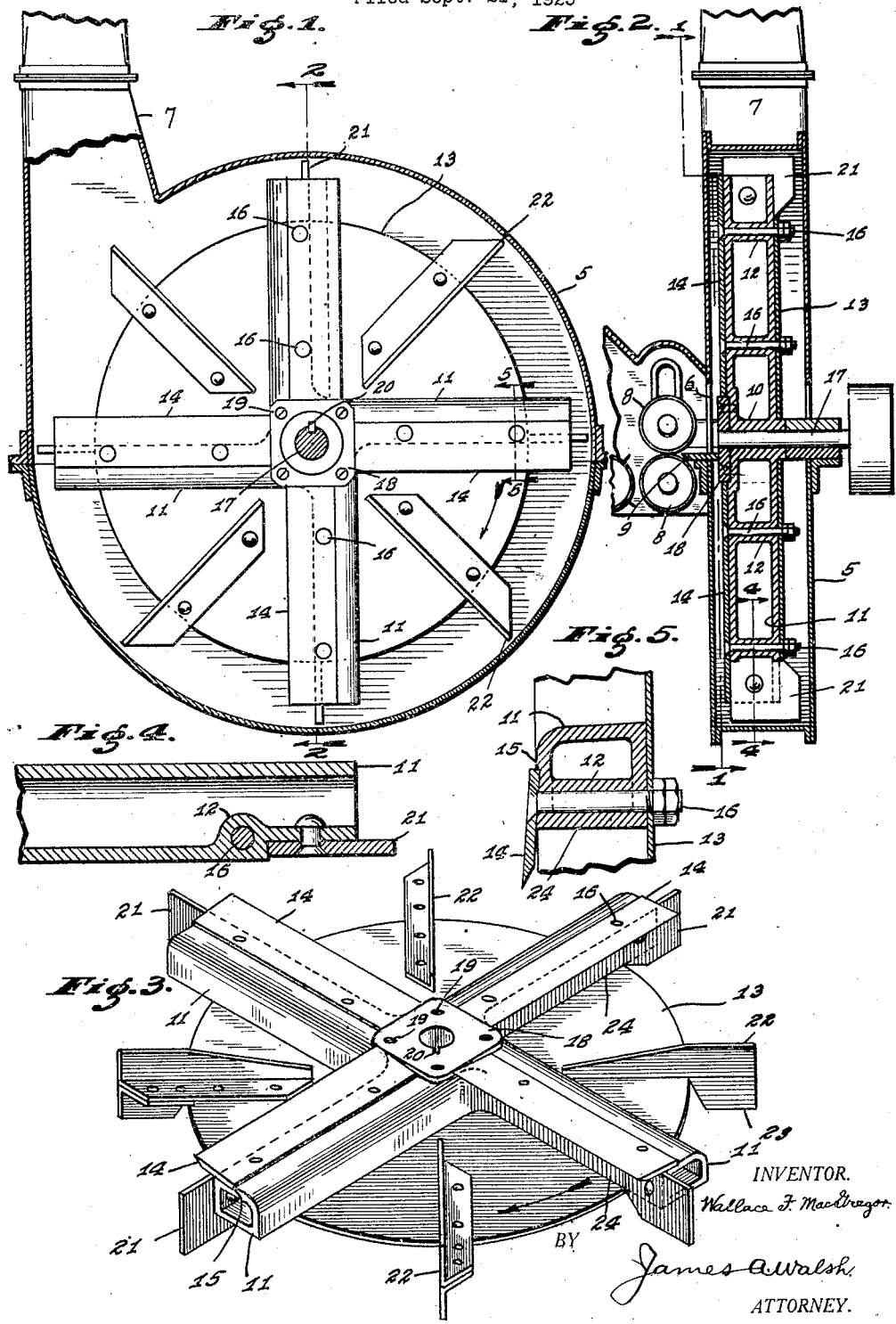
INVENTOR.
Wallace F. MacGregor
BY
James A. Walsh
ATTORNEY.

Patented Mar. 9, 1926.

1,575,853

UNITED STATES PATENT OFFICE.

WALLACE F. MacGREGOR, OF RACINE, WISCONSIN, ASSIGNOR TO J. I. CASE THRESHING MACHINE COMPANY, OF RACINE, WISCONSIN, A CORPORATION.

ENSILAGE CUTTER.

Application filed September 21, 1925. Serial No. 57,553.

*To all whom it may concern:*

Be it known that I, WALLACE F. MAC-GREGOR, a citizen of the United States, residing at Racine, in the county of Racine and State of Wisconsin, have invented certain new and useful Improvements in Ensilage Cutters, of which the following is a specification.

My invention relates to cutting wheels particularly adapted for use with ensilage or corn cutters, my object being to provide a strong, durable and well balanced cutting wheel for the purpose, and one safe from explosion by centrifugal force, the elements of which may be readily assembled in manufacture, disconnected for replacement of parts or repair, and so related as to insure efficient cutting and blast creating power necessary for filling silos, as will hereinafter appear.

In the accompanying drawing, forming part hereof, Figure 1 is a face or front view of an ensilage cutter embodying my improvements, taken on the dotted line 1—1 in Fig. 2; Fig. 2 a sectional view thereof on the dotted line 2—2 in Fig. 1; Fig. 3 a perspective of the cutter wheel; and Figs. 4 and 5 are detail sectional views taken on the dotted lines 4—4 and 5—5, respectively, in Figs. 2 and 1.

In said drawing the portions marked 5 designate the casing, 6 the inlet thereof, 7 the boot or discharge outlet, 8 a portion of the feeding mechanism for conveying material to be cut into said wheel, and 9 the shear plate, said parts being of any well know or desired character.

My improved wheel comprises a suitable hub, 10, having preferably formed integrally therewith a plurality of hollow spokes or arms, 11, said structure being in effect a spider, said spokes embodying enlargements, 12, for a purpose to appear. Said spider is positioned upon a disk, 13, forming the back of the cutting wheel, and upon the front sides of said arms in parallel relation to said disk I mount cutting knives, 14, which may be seated in offset portions of the upper sides of said arms and abut against the latter, as at 15, said disk, arms and knives being securely connected by bolts, 16, passing through said enlargements 12. The structure described is mounted upon a shaft, 17, a guard, 18, for the knives 14, being recessed in and connected by screws, 19, to said hub 10 and therewith assembled upon said shaft by a key, 20, or other desired manner, said guard 18 being provided to prevent twine and other material from clinging and accumulating at the inner ends of the knives 14. Also on said knife-wheel arms 11 I secure fan blades, 21, arranged at substantially right angle to knives 14, and upon said disk between arms 11 I mount fan blades, 22, the vanes, 23, of said blades preferably projecting rearwardly beyond the plane of disk 13 and secured to the blades proper by rivets or otherwise.

It will thus be seen that the spider comprising the hub and arms or spokes 11 is of comparatively stiff and light construction, and that the front wall, 24, of each spoke, lying at right angles to disk 13, closes the space between the disk and knives, so that material can not pass through the arms but is carried on around by said arms and knives and the blast from blades 21 and 22 to the boot or outlet of the casing; in other words, the stop walls 24, disk 13 and knives 14 constitute pockets, so that as the knives rotate past shear plate 9 the material is both cut by the knives and carried by these pockets to the casing outlet. As will be apparent, the manner of assembling the spider, disk and knives is very simple and admits of readily connecting and disconnecting the parts, by which I produce a knife wheel comparatively of light weight, and by disposing the arms and blades in the manner disclosed a powerful blast is created for conveying material and discharging the same at a distance from the machine for filling silos and the like.

I claim as my invention:

1. In an ensilage cutter, a casing embodying inlet and discharge openings, and a knife wheel therein comprising a disk, a plurality of arms on said disk, knives on said arms, fan blades on said arms, means for securing said disk, arms and knives together, and fan blades on said disk intermediate said arms.

2. In an ensilage cutter, a fan wheel comprising a disk, a plurality of hollow arms on said disk, blades positioned on said arms in longitudinal relation thereto and having their cutting edges projecting beyond the walls of said arms, means for securing said arms and knives to said disk, and fan blades on said disk intermediate said arms.

3. In an ensilage cutter, a fan-wheel comprising a disk, a spider embodying a hub and arms extending from said hub, knives on said arms projecting laterally therefrom and forming therewith and with said disk pockets for retaining material, means for securing said arms and knives to said disk, and a guard on said spider intersecting said knives.

4. In an ensilage cutter, a fan-wheel comprising a disk, arms on said disk, knives on said arms having their cutting edges projecting beyond the walls of the latter to form therewith and with said disk a pocket for retaining material, fan blades on said disk the outer edges of which rotate in substantially the same plane as said knives, and vanes on said blades projecting beyond the plane of said disk.

In testimony whereof I affix my signature.

WALLACE F. MacGREGOR.